(12) United States Patent
Slank

(10) Patent No.: US 7,891,321 B2
(45) Date of Patent: Feb. 22, 2011

(54) QUICK-RELEASE ANIMALS MUZZLE

(76) Inventor: Adam Slank, 2329 Westlake Dr. #3, Austin, TX (US) 78746

(*) Notice: Subject to any disclaimer, the term of this patent is extended or adjusted under 35 U.S.C. 154(b) by 172 days.

(21) Appl. No.: 12/319,803

(22) Filed: Jan. 12, 2009

(65) Prior Publication Data
US 2010/0175636 A1  Jul. 15, 2010

Related U.S. Application Data

(60) Provisional application No. 61/006,887, filed on Feb. 5, 2008.

(51) Int. Cl.
*A01K 25/00* (2006.01)
(52) U.S. Cl. ...................... 119/831; D30/152
(58) Field of Classification Search ................ 119/814, 119/821, 827, 831, 832; 54/24, 85; D30/152
See application file for complete search history.

(56) References Cited

U.S. PATENT DOCUMENTS

| | | | |
|---|---|---|---|
| 435,308 A * | 8/1890 | Johnson | 119/823 |
| 3,126,869 A * | 3/1964 | Young et al. | 119/712 |
| 4,252,086 A * | 2/1981 | Schenck | 119/831 |
| 4,603,659 A | 8/1986 | Helphrey | |
| D289,810 S | 5/1987 | Kotas | |
| 5,136,984 A | 8/1992 | Askinasi | |
| 5,267,529 A * | 12/1993 | Zelinger | 119/831 |
| 5,299,531 A | 4/1994 | Dietz | |
| 5,588,398 A | 12/1996 | Allen | |
| 5,762,030 A * | 6/1998 | Paglericcio et al. | 119/831 |
| 5,785,008 A | 7/1998 | Liu | |
| 6,164,246 A | 12/2000 | Naftaly | |
| 6,553,945 B2 | 4/2003 | Rice | |
| 7,140,326 B2 | 11/2006 | Jenny | |
| 7,444,960 B1 | 11/2008 | Williams | |
| 2007/0028856 A1 | 2/2007 | Ma | |
| 2007/0039564 A1 | 2/2007 | Steunou | |

* cited by examiner

*Primary Examiner*—Rob Swiatek
*Assistant Examiner*—Ebony Evans
(74) *Attorney, Agent, or Firm*—David O. Simmons

(57) ABSTRACT

An animal muzzle has a retention strap, an interlock member attached to a first end portion of the retention strap, and a muzzle body attached to a second end portion of the retention strap. The muzzle body includes two longitudinally extending edge portions and an interlock structure adjacent each of the edge portions. The interlock structures are configured for having the interlock member simultaneously engaged therewith. The interlock structures are longitudinally offset from each other such that they are longitudinally adjacent to each other in a manner allowing the interlock member to be slideable engaged therewith when the muzzle body is in a snout-encompassing configuration. The muzzle body is maintained in the snout-encompassing configuration when the interlock member is engaged with the interlock structures. The muzzle body automatically transitions to a non-constraining configuration when the interlock member is disengaged from the interlock structures.

20 Claims, 1 Drawing Sheet

QUICK-RELEASE ANIMALS MUZZLE

CROSS REFERENCE TO RELATED APPLICATIONS

This patent application claims priority from U.S. Provisional Patent Application having Ser. No. 61/006,887 filed Feb. 5, 2008 entitled "Disassembling Animal Muzzle", having a common applicant herewith and being incorporated herein in its entirety by reference.

FIELD OF THE DISCLOSURE

The disclosures made herein relate generally to animal muzzles and, more particularly, to an animal muzzle configured for being quickly released from around the snout of an animal.

BACKGROUND

Various types of animals (e.g., dogs) often must wear a muzzle to protect other animals and/or people from such muzzle-wearing animal. The muzzle includes a muzzle body that fits around the snout of an animal and a strap or other retention means for securing the muzzle body in place. The muzzle body is configured to prevent or limit separation of the animal's jaws. Furthermore, most muzzles also serve to shroud at least a portion of the animal's teeth from view. In this manner, a muzzle serves to mitigate the possibility that the muzzle-wearing animal will unintentionally bite another animal or a person.

There are instances in which it is desirable for an animal to be able to actually bite a person or create fear in a person that the animal will bite them. For example, when appropriately trained, dogs can be effective in subduing a person, especially those that have isolated themselves in locations that are difficult to access by law enforcement or military personnel. In such instances, it may be advantageous to rely on a dog's ability to bite to flush out the person and/or subduing them. However, civil and criminal lawsuits have been brought against entities (e.g., law enforcement agencies) that have employed dogs (i.e., animals) that have bitten suspects during their apprehension. Furthermore, under certain circumstances, dogs trained to be aggressive have also been known to bite unintended individuals (e.g., innocent bystanders, animal keepers, animal trainers, etc).

Because of the foregoing concerns, animals that have the potential to bite an unintended victim are often fitted with a muzzle. However, in the case where the real or perceived ability for an animal to bite a victim is an intended objective, a muzzle that detracts from this intended objective is undesirable. For example, in the case of a dog used for apprehending criminal suspects, a criminal suspect is less likely to submit to apprehension by a dog that is muzzled and therefore unable to bite the suspect. Therefore, a muzzle that can be released from around an animal's snout in a quick and, preferably, one-handed operation is advantageous and desirable.

SUMMARY OF THE DISCLOSURE

Embodiments of the present invention provide for effective and safe muzzling of an animal. More specifically, embodiments of the present invention provide for a muzzle that can be released from around an animal's snout in a quick and, preferably, one-handed operation. In doing so, embodiments of the present invention address essential requirements of a muzzle useful in environments where an animal such as a dog must be muzzled to prevent biting unintended victims but must also be quickly de-muzzled for the purpose of allowing the dog to bite an intended victim if necessary.

In one embodiment of the present invention, an animal muzzle comprises a retention strap having a first end portion and a second end portion, an interlock member attached to the first end portion of the retention strap, and a muzzle body attached to the second end portion of the retention strap. The muzzle body includes two longitudinally extending edge portions and an interlock structure attached thereto adjacent each one of the edge portions. The interlock structures are configured for having the interlock member simultaneously engaged therewith. The edge portions extend along a length of the muzzle body between end portions thereof. The interlock structures are longitudinally offset from each other along the edge portions such that the interlock structures are longitudinally adjacent to each other in a manner allowing the interlock member to be slideable engaged therewith when the muzzle body is in a snout-encompassing configuration. The muzzle body is maintained in the snout-encompassing configuration when the interlock member is engaged with the interlock structures. The muzzle body automatically transitions from the snout constraining configuration to a non-constraining configuration when the interlock member is disengaged from at least one of the interlock structures.

In another embodiment of the present invention, an animal muzzle comprises a retention strap having a first end portion and a second end portion, an elongated interlock member attached to the first end portion of the retention strap, a muzzle body attached to the second end portion of the retention strap, and a securing structure. The muzzle body includes two longitudinally extending edge portions each having a first interlock member receiving structure integral therewith. The interlock member receiving structures are each configured for having the elongated interlock member slideably disposed at least partially therethrough. The interlock member receiving structure of a first one of the edge portions is longitudinally offset from the interlock member receiving structure of a second one of the edge portions such that the interlock member receiving structures are longitudinally aligned in a manner allowing the elongated interlock member to be slideable disposed therethrough when the edge portions are in a proximate orientation. The muzzle body defines a snout receiving passage therein when the edge portions are in the proximate orientation. The interlock member securing structure is attached to the first end portion of the retention strap in a manner allowing a fastening device of the interlock member securing structure to be fixedly engaged with a mating fastening device of the muzzle body to preclude the elongated interlock member from being slideably withdrawn from within the interlock member receiving structures when the fastening devices are engaged with each other.

In another embodiment of the present invention, an animal muzzle comprises a retention strap, an interconnect rod, a muzzle body, and an interconnect rod securing strap. The retention strap has a first end portion, a second end portion, and a disconnect assembly and/or an adjustment assembly between the end portions. The interconnect rod is attached to the first end portion of the retention strap. The muzzle body is attached to the second end portion of the retention strap. The muzzle body includes two longitudinally extending edge portions each having a first interconnect rod engaging structure integral therewith. Each one of the interconnect rod engaging structures has an interconnect rod receiving passage extending therethrough and each one of the interconnect rod receiving passages extends generally parallel with a respective one of the edge portions. The interconnect rod engaging structure of a first one of the edge portions is longitudinally offset from the interconnect rod engaging structure of a second one of the edge portions such that the interconnect rod receiving passages are axially aligned for allowing the interconnect rod to be slideable engaged therein when the edge portions are in a proximate orientation. The muzzle body defines a snout receiving passage therein when the edge portions are in the proximate orientation. The interconnect rod securing strap is attached to the first end portion of the retention strap. The interconnect rod securing strap is sufficiently long for allowing a portion thereof to extend over an adjacent portion of the muzzle body with the interconnect rod engaged within the interconnect rod receiving passages when the edge portions are in the proximate orientation. The portion of the interconnect rod securing strap extendable over the adjacent portion of the muzzle body includes a fastening device disengagably engagable with a mating fastening device of the muzzle body to preclude the interconnect rod from being slideably withdrawn from within the interconnect rod receiving passages when the fastening devices are engaged with each other.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
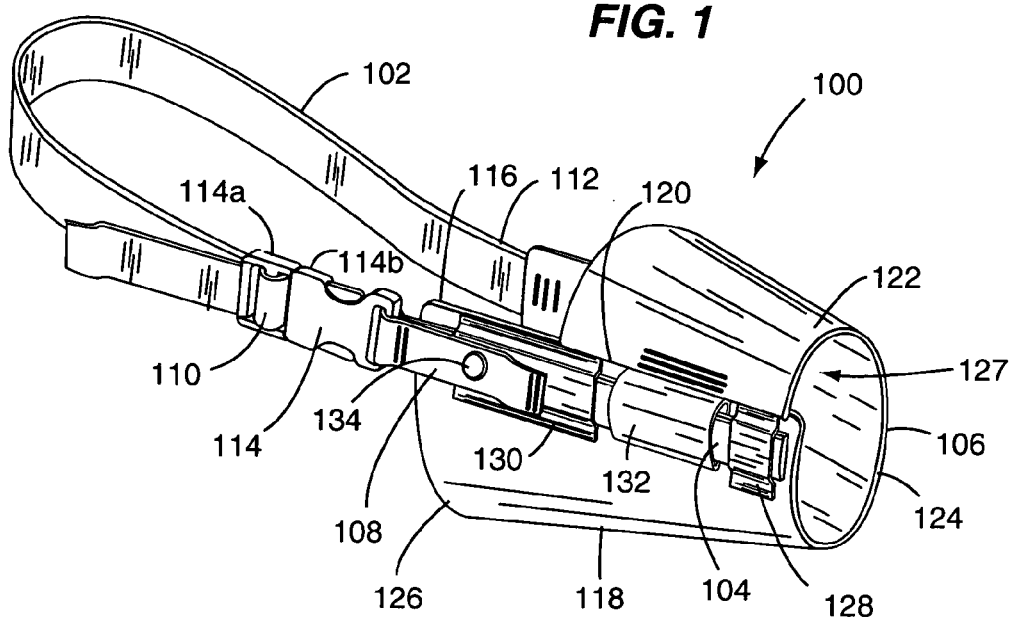
FIG. 1 is a perspective view showing a muzzle in accordance with the present invention in a snout-constraining (i.e., encompassing) configuration.
Figure 2:
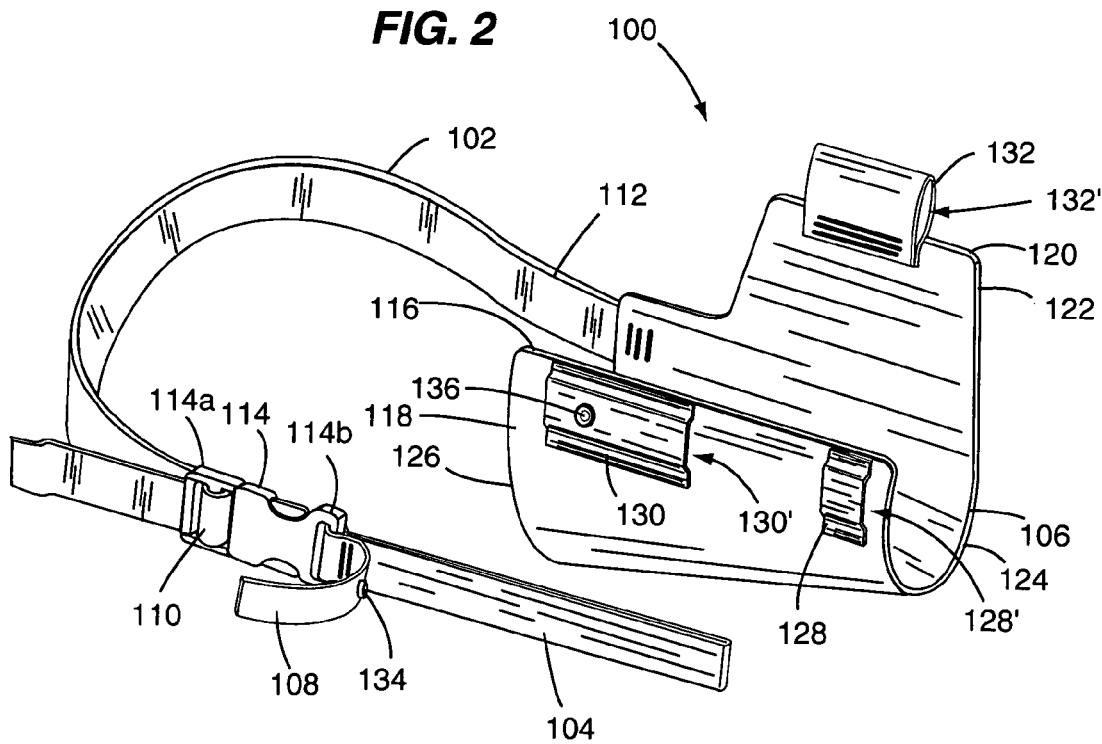
FIG. 2 is a perspective view showing the muzzle of FIG. 1 in a non-constraining (i.e., released) configuration.

Referring to FIGS. 1 and 2, an embodiment of a quick releasing muzzle (i.e., muzzle 100) in accordance with the present invention is shown. The muzzle 100 provides for effective and safe muzzling of an animal. The muzzle 100 can be released from around an animal's snout in a quick, one-handed operation. In this manner, the muzzle 100 is especially useful in environments where an animal such as a dog must be muzzled to prevent it from biting unintended victims but where the animal must also be quickly de-muzzled for the purpose of allowing the dog to bite an intended victim, if necessary.

The muzzle 100 includes a retention strap 102, an interconnect rod 104, a muzzle body 106 and an interconnect rod securing strap 108. The retention strap 102 has a first end portion 110, a second end portion 112, and a strap disconnect/adjustment assembly 114 connected between the end portions 110, 112. In a preferred embodiment, the retention strap 102 is made from a woven polymeric material such as nylon fabric (e.g., webbing). The interconnect rod 104 is attached to the first end portion 110 of the retention strap 102 through the strap disconnect/adjustment assembly 114. The strap disconnect/adjustment assembly 114 is configured for allowing an effective length of the retention strap 102 to be adjusted and for allowing the retention strap 102 to be selectively detached from the interconnect rod 104. One example of the strap disconnect/adjustment assembly 114 is a strap buckle that includes a female buckle portion (e.g., 114a), a male buckle portion (114b) engagable within the female buckle portion (114a), and a strap adjustment portion in combination with the female buckle portion (114a) and/or a male buckle portion (114b). A person of ordinary skill in the related art will appreciate that such a strap buckle is commercially available from any number of sources.

The muzzle body 106 includes a first edge portion 116 defined by a lower portion 118 of the muzzle body 106 and a second edge portion 120 defined by an upper portion 122 of the muzzle body 106. The second end portion 112 of the retention strap 102 is attached to the lower end portion 118 of the muzzle body 106 by means such as, thread, ultrasonic welding, mechanical fastener or other suitable means of attachment.

As shown, the muzzle body 106 is formed from a layer of material (e.g., a woven polymeric material such as nylon fabric webbing) with the first and second edge portions 116, 120 thereof defining generally opposing edges of the layer of material. The lower and upper portions 118, 122 of the muzzle body 106 are defined by adjacent areas of the layer of material. The lower portion 118 is configured for fitting under a snout and jaws of an animal and the upper portion 122 is configured for fitting over the snout of the animal. The lower and upper portions 118, 122 of the muzzle body 106 both extending from a first end portion 124 of the muzzle body 106 toward a second end portion 126 of the muzzle body 106. With respect to a longitudinal reference axis of a snout receiving passage 127 formed by the lower and upper portions 118, 122 of the muzzle body 106, the upper end portion 122 is shorter than the lower portion 118 such that the lower portion 118 defines the first and second end portions 124, 126 of the muzzle body 106.

Alternatively, the muzzle body 106 can be made from two or more pieces of material attached by sewing, ultrasonic welding or the like. Similarly, the muzzle body can be made from one or more injection molded pieces, extruded pieces or the like.

The first edge portion 116 of the muzzle body 106 has two spaced apart interconnect rod engaging structures 128, 130 integral therewith (i.e., integral with the lower portion 118 of the muzzle body 106) and the second edge portion 120 of the muzzle body 106 has an interconnect rod engaging structure 132 integral therewith (i.e., integral with the upper portion 122 of the muzzle body 106). Each one of the interconnect rod engaging structures 128, 130, 132 has a respective interconnect rod receiving passage 128', 130', 132' extending therethrough. The interconnect rod receiving passages 128', 130' of the interconnect rod engaging structures 128, 130 integral with lower portion 118 of the muzzle body 106 extend along a common reference axis. The interconnect rod engaging structure 132 of the upper portion 122 of the muzzle body 106 is longitudinally offset from the interconnect rod engaging structures 128, 130 of the lower portion of the muzzle body 106 such that all of the interconnect rod receiving passages 128', 130', 132' are axially aligned for allowing the interconnect rod 104 to be slideable engaged through the interconnect rod receiving passages 128', 130', 132' when the edge portions 116, 120 of the muzzle body 106 in a proximate orientation (e.g., side-by-side orientation, adjacent orientation, over-under orientation, etc) with respect to each other. The muzzle body 106 is in a configuration that defines the snout receiving passage 127 when the edge portions 116, 120 are in the proximate orientation.

The interconnect rod securing strap 108 is attached to the first end portion 110 of the retention strap 102 through the strap disconnect/adjustment assembly 114. As shown, the interconnect rod securing strap 108 and the interconnect rod 104 are made from a single piece of strap material (i.e., nylon strap). The interconnect rod 104 is formed by folding the strap material onto itself and fastening such double-layer portion by means such as thread, ultrasonic welding, mechanical fastener or other suitable means of attachment, thereby forming an interconnect rod that the suitably rigid, generally straight and flat. It is disclosed herein that the interconnect rod 104 is one embodiment of an interconnect member in accordance with the present invention. In other embodiments, such an interconnect member can be made from another material (e.g., plastic rod or pipe) and/or can be a discretely formed article with respect to the interconnect rod securing strap 108.

A portion of the strap material extending from the interconnect rod 104 serves as the interconnect rod securing strap 108 and can be of a single layer of the strap material or multiple layer construct similar to the interconnect rod 104. The interconnect rod securing strap 108 is sufficiently long for allowing a portion of the interconnect rod securing strap 108 to extend over the interconnect rod engaging structure 130, which is adjacent the second end portion 126 of the muzzle body 106 when the interconnect rod 104 is properly engaged within the interconnect rod receiving passages 128', 130', 132' with the edge portions 116, 120 are in the proximate orientation. The portion of the interconnect rod securing strap 108 extendable over the adjacent portion of the muzzle body 106 includes a fastening device 134 disengagably engagable with a mating fastening device 136 of the muzzle body 106 to preclude the interconnect rod 104 from being slideably withdrawn from within the interconnect rod receiving passages 128', 130', 132' when the fastening devices 134, 136 are engaged with each other. Examples of the fastening devices 134, 136 include, but are not limited to, mechanical snap fasteners, hook-loop fastening material, etc. The primary requirement for the interconnect rod securing strap 108 and fastening devices 134, 136 is that they preclude the interconnect 104 from unintentionally/inadvertently withdrawing from within the interconnect rod receiving passages 128', 130', 132'.

As shown in FIGS. 1 and 2, the lower portion 118 of the muzzle body 106 includes spaced apart layers of material defining the interconnect rod receiving passages 128' and 130'. The layers of material are adjoined to each other (e.g., to form a sleeve) by means such as thread, ultrasonic welding, mechanical fastener or other suitable means of attachment. As can also be seen in FIGS. 1 and 2, the interconnect rod receiving structure 132 is formed by a folded over tab of material that is attached to the upper portion 122 of the muzzle body 106 by means such as thread, ultrasonic welding, mechanical fastener or other suitable means of attachment. Preferably, but not necessarily, the fastening device 136 of the muzzle body 106 is attached to an outer one of the spaced apart material layers defining the interconnect rod receiving structure 130 adjacent the second end portion 126 of the muzzle body 106.

As shown, the muzzle 100 has an interconnect arrangement on one side only. Such an interconnect arrangement includes the interconnect rod engaging structures 128, 130, 132, the interconnect rod 104, the interconnect rod securing strap 108, and the fastening devices 134, 136. A muzzle configured in accordance with the present invention is not limited to the interconnect arrangement being on a particular side. Specifically, a muzzle configured in accordance with the present invention can have a single interconnect arrangement on the left side or right side. Furthermore, it is contemplated herein that a muzzle configured in accordance with the present invention can have dual interconnect arrangements (e.g., one on the left side and one on the right side). In such case, each opposing end portions of the retention strap is connected to the muzzle body through a respective attached interconnect member as opposed to one end portion being attached directly to the muzzle body.

In use, the muzzle 100 is mounted on an animal in the configuration shown in FIG. 1 (i.e., muzzle secured in the snout encompassing configuration). The snout of the animal is positioned within the snout passage 127 of the muzzle body 106 with the retention strap engaged around the back of the animal's head. In this manner, the muzzle 100 is securely fastened to the animal's head with its snout disposed within the snout passage 127. When the free end of the interconnect rod securing strap 108 is pulled on with sufficient force to detach the fastening devices 134, 136 from each other, continued exertion of force causes the interconnect rod 104 to be automatically withdrawn from within the interconnect rod engaging structure passages 128', 130' 132'. In doing so, the lower and upper portions 118, 122 separate (i.e., become disjoined) at the edge portions 116, 120. Because the interconnect rod 104 serves to also fasten the retention strap 102 around the head of the animal, withdrawing of the interconnect rod 104 from the interconnect rod engaging structure passages 128', 130' 132' also causes the retention strap 102 to become released from around the animal's head. As such, the entire muzzle 100 becomes quickly released from the animal's head by withdrawing the interconnect rod 104 from within the interconnect rod engaging structure passages 128', 130' 132'.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An animal muzzle, comprising:

a retention strap having a first end portion and a second end portion;

an interlock member attached to the first end portion of the retention strap; and a muzzle body attached to the second end portion of the retention strap, wherein the muzzle body includes two longitudinally-extending edge portions and an interlock structure attached thereto adjacent each one of said edge portions, wherein said interlock structures are configured for having the interlock member simultaneously engaged therewith, wherein said edge portions extend along a length of the muzzle body between end portions thereof, wherein said interlock structures are longitudinally offset from each other along said edge portions such that said interlock structures are longitudinally adjacent to each other in a manner allowing the interlock member to be slideable engaged therewith when the muzzle body is in a snout encompassing configuration, wherein the muzzle body is maintained in the snout encompassing configuration when the interlock member is engaged with said interlock structures and wherein the muzzle body automatically transitions from the snout constraining configuration to a non-constraining configuration when the interlock member is disengaged from at least one of said interlock structures.

2. The animal muzzle of claim 1 wherein:

the interlock member includes a generally straight interconnect rod portion, said interlock structures each include a respective interlock member receiving passage extending therethrough, wherein said interlock member receiving passages are configured for having said interconnect rod portion of the interlock member slideably engaged therein; and said interlock member receiving passages are axially aligned when said edge portions are in a side-by-side orientation for allowing said interconnect rod portion of the interlock member to be simultaneously engaged within said interlock member receiving passages when said edge portions are in a proximate orientation.

3. The animal muzzle of claim 1 wherein:

the muzzle body includes an upper portion and a lower portion both extending from a first end portion thereof toward a second end portion thereof;

the upper end portion is shorter than the lower portion such that the lower portion defines said first and second end portions of the muzzle body; and the first end portion of the retention strap is attached to the lower portion of the muzzle body at the second end portion thereof.

4. The animal muzzle of claim 3 wherein:

a first one of said edge portions of the muzzle body is defined by the lower portion thereof and a second one of said edge portions is defined by the upper portion thereof; and the interlock structure of the lower portion of the muzzle body is immediately adjacent said first edge portion thereof.

5. The animal muzzle of claim 4 wherein:

the lower portion of the muzzle body includes an interlock member receiving structure adjacent the second end portion thereof;

the interlock structure of the lower portion of the muzzle body and the interlock member receiving structure each include a respective interlock member receiving passage extending therethrough;

the interlock member includes a generally straight interconnect rod portion; and said interlock member receiving passages of the lower portion of the muzzle body are axially aligned such that said interconnect rod portion of the interlock member can be slideably engaged simultaneously within said interlock member receiving passages of the lower portion.

6. The animal muzzle of claim 5, further comprising:

an interlock member securing strap attached to the second end portion of the retention strap, wherein the interlock member securing strap includes a first fastening device attached thereto; and a second fastening device attached to the lower portion of the muzzle body on the interlock member receiving structure thereof;

wherein said fastening devices are interconnectable for preclude said interconnect rod portion of the interlock member from being slideably withdrawn from within said interconnect rod receiving passages when said fastening devices are engaged with each other.

7. The animal muzzle of claim 6 wherein:

the lower portion of the muzzle body includes spaced apart layers of material defining the interlock member receiving passages thereof;

the second fastening device is attached to an outer one of said spaced apart material layers defining the interlock member receiving passage adjacent the second end portion of the muzzle body.

8. An animal muzzle, comprising:

a retention strap having a first end portion and a second end portion;

an elongated interlock member attached to the first end portion of the retention strap;

a muzzle body attached to the second end portion of the retention strap, wherein the muzzle body includes two longitudinally-extending edge portions each having a first interlock member receiving structure integral therewith, wherein said interlock member receiving structures are each configured for having the elongated interlock member slideably disposed at least partially therethrough, wherein the interlock member receiving structure of a first one of said edge portions is longitudinally offset from the interlock member receiving structure of a second one of said edge portions such that said interlock member receiving structures are longitudinally aligned in a manner allowing the elongated interlock member to be slideable disposed therethrough when said edge portions are in a proximate orientation and wherein the muzzle body defines a snout receiving passage therein when said edge portions are in the proximate orientation; and an interlock member securing structure attached to the elongated interlock member in a manner allowing a fastening device of the interlock member securing structure to be fixedly engaged with a mating fastening device of the muzzle body to preclude the elongated interlock member from being slideably withdrawn from within said interlock member receiving structures when said fastening devices are engaged with each other.

9. The animal muzzle of claim 8 wherein:

the interlock member securing structure includes an the interlock member securing strap having the fastening device of the interlock member securing structure attached thereto;

the elongated interlock member is generally straight, said first interlock member receiving structures each include a respective interlock member receiving passage extending therethrough, wherein said interlock member receiving passages are configured for having the elongated interconnect member slideably engaged therein; and said interlock member receiving passages are axially aligned when said edge portions are in the proximate orientation for allowing the elongated interconnect member to be simultaneously engaged within said interlock member receiving passages when said edge portions are in the proximate orientation.

10. The animal muzzle of claim 8 wherein:

the muzzle body includes an upper portion and a lower portion both extending from a first end portion thereof toward a second end portion thereof;

the upper end portion is shorter than the lower portion such that the lower portion defines said first and second end portions of the muzzle body; and the first end portion of the retention strap is attached to the lower portion of the muzzle body at the second end portion thereof.

11. The animal muzzle of claim 10 wherein:
a first one of said edge portions of the muzzle body is defined by the lower portion thereof and a second one of said edge portions is defined by the upper portion thereof; and
the interlock member receiving structure of the lower portion of the muzzle body is immediately adjacent said first edge portion thereof.

12. The animal muzzle of claim 11 wherein:
the lower portion of the muzzle body includes a second interlock member receiving structure adjacent the second end portion thereof;
the second interlock member receiving structure includes a respective interlock member receiving passage extending therethrough;
the elongated interlock member is generally straight; and
said interlock member receiving passages are axially aligned when said edge portions are in the proximate orientation for allowing the elongated interconnect member to be simultaneously engaged within all of said interlock member receiving passages when said edge portions are in the proximate orientation.

13. The animal muzzle of claim 12, further comprising:
a first fastening device attached to the second end portion of the retention strap; and
a second fastening device attached to the lower portion of the muzzle body on the interlock member receiving structure thereof;
wherein said fastening devices are interconnectable for preclude the elongated interconnect member from being slideably withdrawn from within said interlock member receiving passages when said fastening devices are engaged with each other.

14. The animal muzzle of claim 13 wherein:
the lower portion of the muzzle body includes spaced apart layers of material defining the interlock member receiving passages thereof;
the second fastening device is attached to an outer one of said spaced apart material layers defining the interlock member receiving passage of the second interlock member structure.

15. An animal muzzle, comprising:
a retention strap having a first end portion, a second end portion and at least one of a disconnect assembly and an adjustment assembly between said end portions;
an interconnect rod attached to the first end portion of the retention strap;
a muzzle body attached to the second end portion of the retention strap, wherein the muzzle body includes two edge portions each having a first interconnect rod engaging structure integral therewith, wherein each one of said interconnect rod engaging structures has an interconnect rod receiving passage extending therethrough, wherein each one of said interconnect rod receiving passages extends generally parallel with a respective one of said edge portions, wherein the interconnect rod engaging structure of the a first one of said edge portions is longitudinally offset from the interconnect rod engaging structure of a second one of said edge portions such that said interconnect rod receiving passages are axially aligned for allowing the interconnect rod to be slideable engaged therein when said edge portions are in a proximate orientation and wherein the muzzle body defines a snout receiving passage therein when said edge portions are in the proximate orientation; and
an interconnect rod securing strap attached to the first end portion of the retention strap, wherein the interconnect rod securing strap is sufficiently long for allowing a portion thereof to extend over an adjacent portion of the muzzle body with the interconnect rod engaged within said interconnect rod receiving passages when said edge portions are in the proximate orientation, wherein the portion of the interconnect rod securing strap extendable over the adjacent portion of the muzzle body includes a fastening device disengagably engagable with a mating fastening device of the muzzle body to preclude the interconnect rod from being slideably withdrawn from within said interconnect rod receiving passages when said fastening devices are engaged with each other.

16. The animal muzzle of claim 15 wherein:
the interconnect rod is generally straight,
said interconnect rod receiving structures each include a respective interconnect rod receiving passage extending therethrough, wherein said interconnect rod receiving passages are configured for having the interconnect rod slideably engaged therein; and
said interconnect rod receiving passages are axially aligned when said edge portions are in the proximate orientation for allowing the interconnect rod to be simultaneously engaged within said interconnect rod receiving passages when said edge portions are in the proximate orientation.

17. The animal muzzle of claim 15 wherein:
the muzzle body includes an upper portion and a lower portion both extending from a first end portion thereof toward a second end portion thereof;
the upper end portion is shorter than the lower portion such that the lower portion defines said first and second end portions of the muzzle body; and
the first end portion of the retention strap is attached to the lower portion of the muzzle body at the second end portion thereof.

18. The animal muzzle of claim 17 wherein:
a first one of said edge portions of the muzzle body is defined by the lower portion thereof and a second one of said edge portions is defined by the upper portion thereof; and
the interconnect rod receiving structure of the lower portion of the muzzle body is immediately adjacent said first edge portion thereof.

19. The animal muzzle of claim 18 wherein:
the lower portion of the muzzle body includes a second interconnect rod receiving structure adjacent the second end portion thereof;
the second interconnect rod receiving structure includes a respective interlock member receiving passage extending therethrough;
the interconnect rod is generally straight; and
said interconnect rod receiving passages are axially aligned when said edge portions are in the proximate orientation for allowing the interconnect rod member to be simultaneously engaged within all of said interconnect rod receiving passages when said edge portions are in the proximate orientation.

20. The animal muzzle of claim 19 wherein:
the lower portion of the muzzle body includes spaced apart layers of material defining the interconnect rod receiving passages thereof; and
the fastening device of the muzzle body is attached to an outer one of said spaced apart material layers defining the interconnect rod receiving passage of the second interconnect rod receiving structure.

* * * * *